United States Patent
Lu et al.

(10) Patent No.: US 8,139,017 B2
(45) Date of Patent: Mar. 20, 2012

(54) CONNECTION REPAIRING METHOD FOR A PLURALITY OF DRIVERS IN A LIQUID CRYSTAL DISPLAY DEVICE

(75) Inventors: Chao Liang Lu, Hsinchu (TW); Chi Mao Hung, Hsinchu (TW); Wei Min Sun, Hsinchu (TW); Yu Chuan Lin, Hsinchu (TW); Kuo Hsing Cheng, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 889 days.

(21) Appl. No.: 12/032,835

(22) Filed: Feb. 18, 2008

(65) Prior Publication Data
US 2009/0059112 A1    Mar. 5, 2009

(30) Foreign Application Priority Data

Sep. 5, 2007 (TW) ............... 96133110 A
Oct. 22, 2007 (TW) ............... 96139520 A

(51) Int. Cl.
*G09G 3/36* (2006.01)
(52) U.S. Cl. ........................... 345/100
(58) Field of Classification Search ............ 345/87–104; 349/54; 327/241–242; 377/64–81; 324/760.01
See application file for complete search history.

(56) References Cited

U.S. PATENT DOCUMENTS

| | | | |
|---|---|---|---|
| 2003/0103045 A1* | 6/2003 | Shiraishi | 345/204 |
| 2003/0137775 A1* | 7/2003 | Yoon | 360/245.9 |
| 2004/0075800 A1* | 4/2004 | Sah et al. | 349/149 |
| 2005/0174316 A1* | 8/2005 | Kang | 345/100 |
| 2007/0035491 A1* | 2/2007 | Chen et al. | 345/87 |
| 2007/0040794 A1* | 2/2007 | Kwak et al. | 345/100 |
| 2007/0063951 A1* | 3/2007 | Lin et al. | 345/93 |
| 2007/0109235 A1* | 5/2007 | Hsu et al. | 345/87 |

* cited by examiner

*Primary Examiner* — Chanh Nguyen
*Assistant Examiner* — Sanghyuk Park
(74) *Attorney, Agent, or Firm* — Thomas, Kayden, Horstemeyer & Risley, LLP

(57) ABSTRACT

A liquid crystal display device, drive circuit, and repair method thereof are provided. The drive circuit includes a plurality of signal lines and a plurality of drivers connected with the signal lines. The drivers have an ordering sequence. Each of the drivers includes a first amplifier and a second amplifier. Each of the first amplifier and the second amplifier includes an input terminal and an output terminal. The output terminal of the first amplifier of each of the driver is coupled to the input terminal of the first amplifier of the next stage driver according to the ordering sequence. The output terminal of the second amplifier of each driver is coupled to the input terminal of the second amplifier of the next stage driver according to the ordering sequence.

10 Claims, 5 Drawing Sheets

CONNECTION REPAIRING METHOD FOR A PLURALITY OF DRIVERS IN A LIQUID CRYSTAL DISPLAY DEVICE

This application claims the benefits from the priorities of Taiwan Patent Application No. 096133110 filed on Sep. 5, 2007 and Taiwan Patent Application No. 096139520 filed on Oct. 22, 2007.

CROSS-REFERENCES TO RELATED APPLICATIONS

Not applicable.

BACKGROUND OF THE INVENTION

1. Field of the Invention

The present invention is related to a liquid crystal display (LCD) device, driver circuit, and repair method thereof, and more particularly, to an LCD device with serially connected drivers, the drivers, and the repair method thereof.

2. Descriptions of the Related Art

In conventional LCD devices, signals are transmitted from the print circuit board (PCB) outside to the drivers disposed on a panel through the flex print circuit (FPC). The signals are transmitted to each driver sequentially. Since the drivers are integrated on the PCB, the connection lines, as well as the rescue line, are made of copper.

FIG. 1 illustrates a glass substrate 193 that is adapted for an LCD device. The glass substrate 193 comprises a display area 190, a scan driver circuit 191, and a data driver circuit 192. Recently, drivers 100, 110, and 120 have been integrated on the glass substrate 193 to reduce cost. Thus, the rescue lines have to be made of thin film lines. The resistance of the thin film lines is greater than that of the copper lines, which makes the signals decay during transmission, and further degrades the repair quality. Because the panels of LCD devices are getting larger, the degradation of the signal becomes more and more severe.

Furthermore, when using laser to repair, the welding points also increase the resistance of the thin film lines. In the conventional design of the rescue lines, every rescued signal is transmitted to the operational amplifiers (Ops) 101, 102, 111, 112, 121, and 122 for amplification. Since the Ops have to drive the whole rescue line, the driving capacity is insufficient for large panels. Moreover, even though only one Op drives the whole rescue line, the other Ops are still in operation, and thus, extra power is consumed.

SUMMARY OF THE INVENTION

Due to the drawbacks of the conventional design of rescue lines, an objective of the present invention is to provide a liquid crystal display device with a rescue function that can reduce the resistance of the rescue lines and avoid extra power consumption caused by the operational amplifier.

Another objective of the present invention is to provide a driver circuit with a rescue function that can reduce the resistance of the rescue lines and avoid extra power consumption caused by the operational amplifier.

A further objective of the present invention is to prevent transmission failure caused by the open circuit of the drive circuit to improve the product yield.

The present invention provides a liquid crystal display device, which comprises a glass substrate, a plurality of scan lines formed on the glass substrate, a plurality of data lines formed on the glass substrate, a plurality of pixels, and a plurality of drivers. The pixels are formed on the cross sectional area of the scan lines and the data lines. The drivers are formed on the glass substrate and connected serially according to an ordering sequence used for driving the pixels. Each of the drivers includes a first amplifier, a second amplifier, a first input pad, and a second input pad. The first amplifier has an input terminal and an output terminal, wherein the output terminal of the first amplifier of each of the drivers is coupled to the input terminal of the first amplifier of the next stage driver according to the ordering sequence. The second amplifier has an input terminal and an output terminal, wherein the output terminal of the second amplifier is coupled to the input terminal of the second amplifier of the next stage driver according to the ordering sequence. The first input pad is electrically connected to the input terminal of the first amplifier. The second input pad is electrically connected to the input terminal of the second amplifier. The output terminal of the first amplifier of each of the drivers is electrically connected to the first input pad of the corresponding next stage driver. The output terminal of the second amplifier of each of the drivers is electrically connected to the second input pad of the next stage driver.

The present invention also provides a driver circuit, which comprises a plurality of signal lines and a plurality of drivers. The drivers are connected serially according to an ordering sequence and coupled to the signal lines. Each of the drivers includes a first amplifier, a second amplifier, a first input pad, and a second input pad. The first amplifier includes an input terminal and an output terminal, wherein the output terminal of the first amplifier is coupled to the input terminal of the first amplifier of the next stage driver. The second amplifier includes an input terminal and an output terminal, wherein the output terminal of the second amplifier is coupled to the input terminal of the second amplifier of the next stage driver. The first input pad is electrically connected to the first input terminal of the first amplifier, while the second input pad is electrically connected to the input terminal of the second amplifier. The output terminal of the first amplifier of each of the drivers is electrically connected to the first input pad of the next stage driver. The output terminal of the second amplifier of each driver is electrically connected to the second input pad of the next stage driver.

The present invention also provides a repair method for a driver circuit. The driver circuit comprises a plurality of drivers, which are connected serially according to an ordering sequence. Each of the drivers comprises a first amplifier and a second amplifier. Each of the first amplifiers includes an input terminal and an output terminal. The output terminal of the first amplifier of each of the drivers is electrically connected to the input terminal of the first amplifier of the next stage driver according to the ordering sequence. Each of the second amplifiers includes an input terminal and an output terminal. The output terminal of the second amplifier of each of the drivers is electrically connected to the input terminal of the second amplifier of the next stage driver. The method comprises the following steps: (a) forming a first loop by connecting the output terminal of the first amplifier of the last stage driver to the input terminal of the first amplifier of the first stage driver; (b) forming a second loop by connecting the output terminal of the second amplifier of the last stage driver to the input terminal of the second amplifier of the first stage driver; and (c) selectively welding one of the input terminals of the first amplifier and the input terminal of the second amplifier with one of the first loop and second loop.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention will be apparent from the following detailed description, which proceeds with reference to the accompanying drawings.

Figure 1:
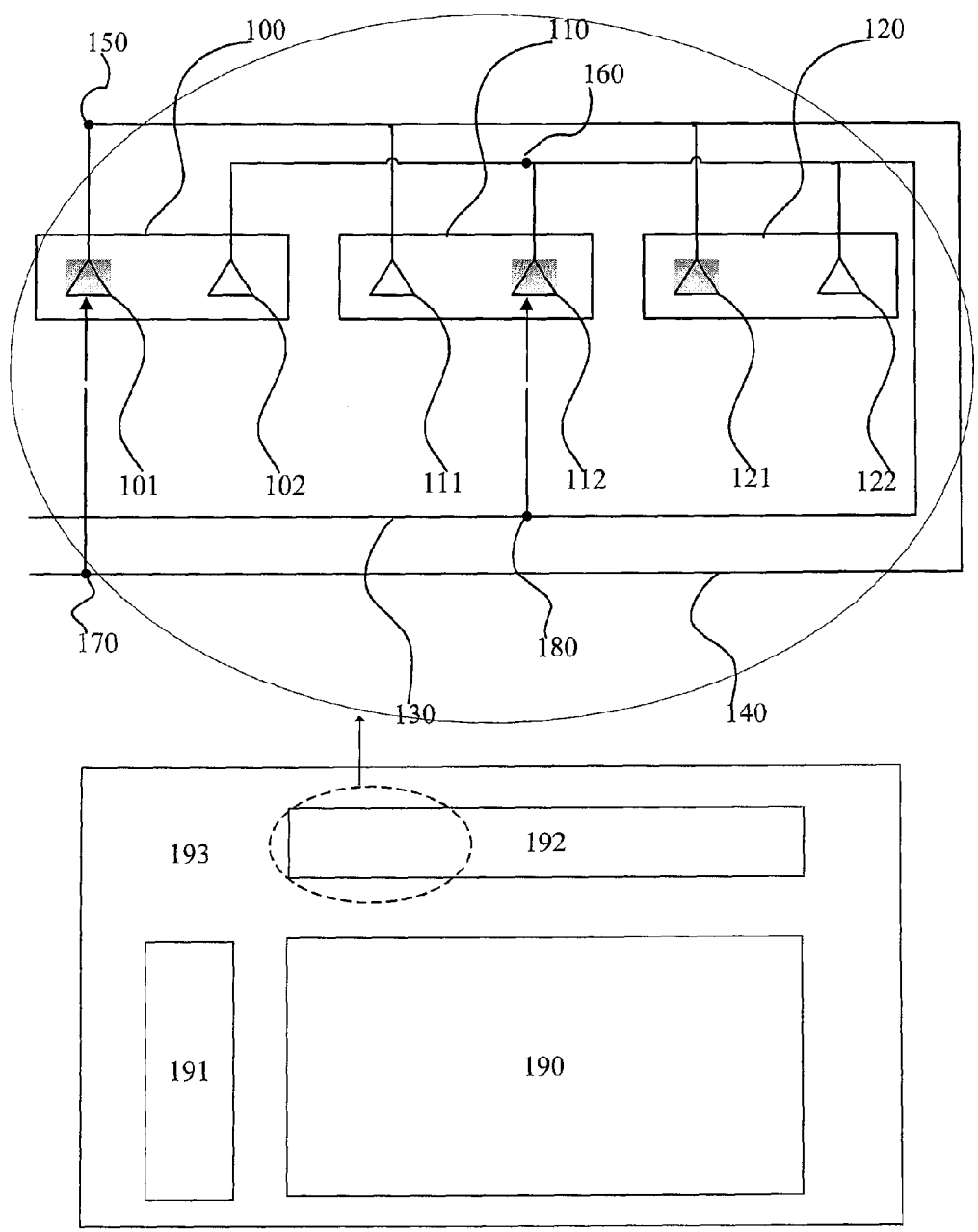
FIG. 1 is a drawing of a conventional driver circuit with a rescue line.
Figure 2A:
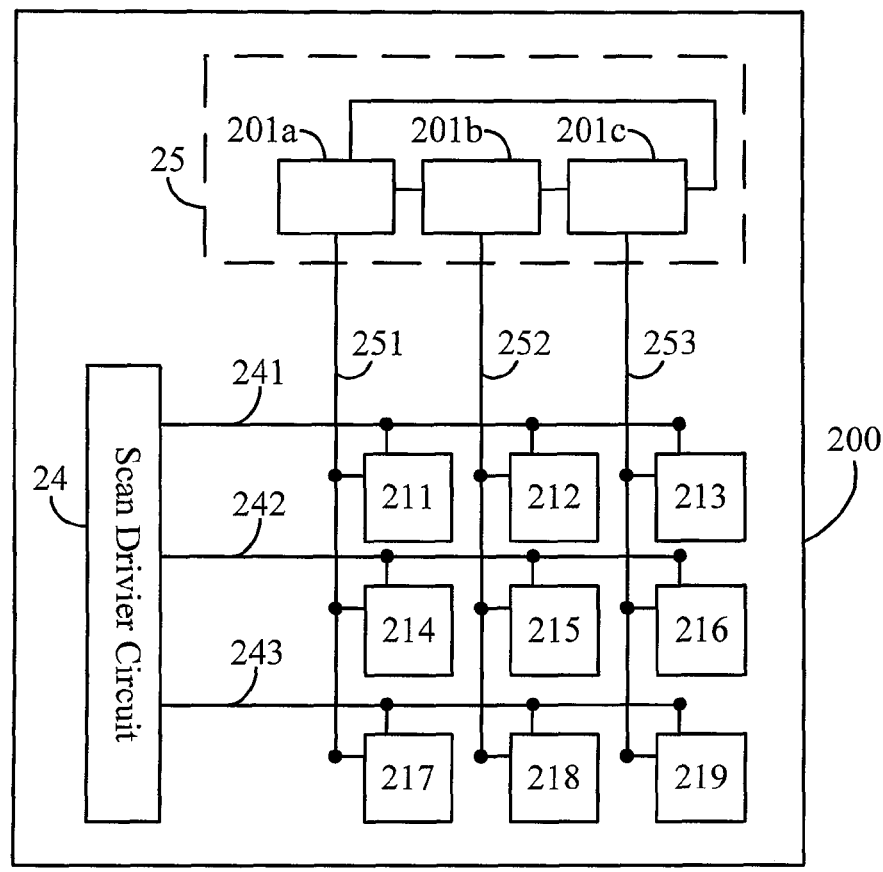
FIG. 2A is a drawing of a liquid crystal display device of the present invention.

FIG. 2 illustrates the preferred embodiment of a liquid crystal display (LCD) device in accordance with the present invention. The LCD device 2 comprises a glass substrate 200, a plurality of scan lines 241, 242, and 243, a plurality of data lines 251, 252, and 253, a scan driver 24, a plurality of data drivers 201a, 201b, and 201c, and a plurality of pixels 211 to 219 form on the cross sections of the scan lines 241, 242, and 243 and the data lines 251, 252, and 253, wherein the drivers 201a, 201b, and 201c are connected to the data lines 251, 252, and 253 respectively. The scan lines 241, 242, and 243, the data lines 251, 252, and 253, and the drivers 201a, 201b, and 201c are directly formed on the glass substrate 200 or integrated on the glass substrate 200 by the chip-on-glass (COG) method or other similar methods. In this embodiment, the drivers are data drivers so that the drivers 201a, 201b, and 201c form a data driver circuit 25. The drivers 201a, 201b, and 201c and scan driver 24 are configured to drive the pixels 211 to 219. It is noted that the numbers of the scan lines, data lines, and pixels are used for better understanding, and are not used to limit the scope of the present invention.

Figure 2B:
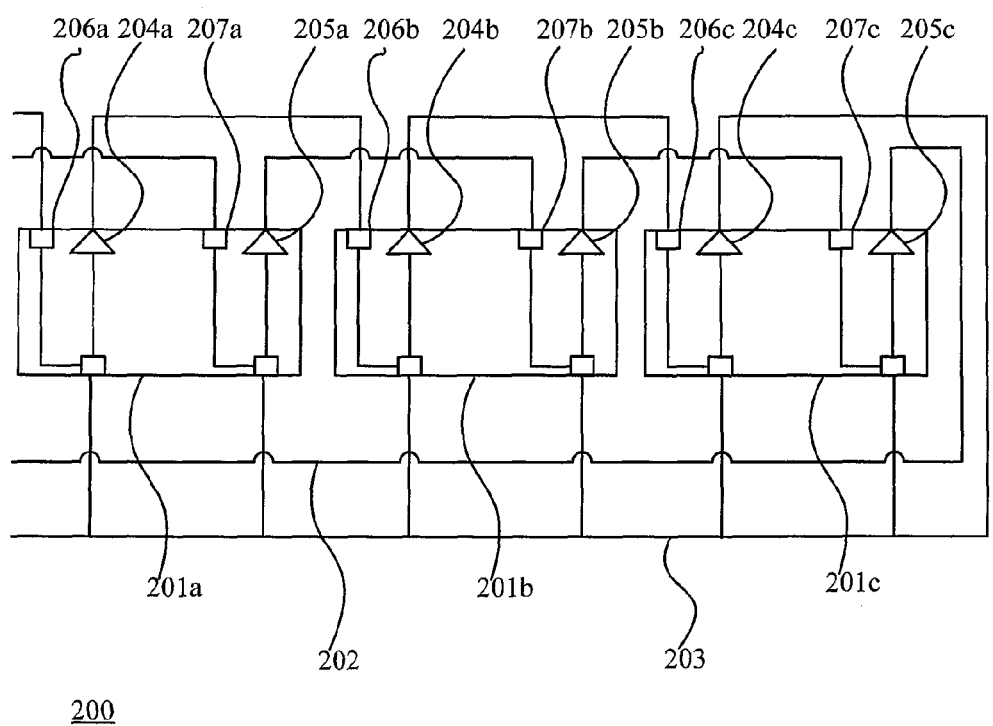
FIG. 2B shows a detailed structure of the driver.

FIG. 2B shows the detailed structure of the drivers 201a, 201b, and 201c. In this embodiment, the drivers 201a, 201b, and 201c are connected serially according to an ordering sequence, wherein the ordering sequence defines that driver 201a is the first stage driver, driver 201b is the second stage driver, and driver 201e is the last stage driver. The ordering sequence is cyclic, for instance, the driver 201b is the next stage driver after driver 201a, driver 201c is the next stage driver after driver 201b, and driver 201a is the next stage driver after driver 201c.

Each of the drivers 201a, 201b, and 201c comprises first amplifiers 204a, 204b, and 204c and second amplifiers 205a, 205b, and 205c, wherein each of the first amplifiers 204a, 204b, and 204c and second amplifiers 205a, 205b, and 205c has an input terminal and an output terminal. In addition, each of the drivers 201a, 201b, and 201c further respectively comprises first input pads 206a, 206b, and 206c, second input pads 207a, 207b, and 207c, third input pads, and fourth input pads. Each of the first input pads 206a, 206b, and 206c is electrically connected to the input terminal of the corresponding first amplifiers 204a, 204b, and 204c though the corresponding third input pads. Each of the second input pads 207a, 207b, and 207c is electrically connected to the input terminal of the corresponding second amplifiers 205a, 205b, and 205c though the corresponding fourth input pads.

The relationship of the drivers 201a, 201b, and 201c is now described. The output terminal of the first amplifier of each stage of the drivers 201a, 201b, and 201c is coupled to the input terminal of the first amplifier of the corresponding next stage driver according to the ordering sequence. More precisely, the output terminal is connected to the first input pad, which is electrically connected to the input terminal of the first amplifier. Similarly, the output terminal of the second amplifier of each stage of driver 201a, 201b, and 201c is connected to the input terminal of the second amplifier of the next stage driver according to the ordering sequence. More precisely, the output terminal is connected to the second input pad, which is electrically connected to the second input terminal of the second amplifier.

To be more specific, the output terminal of the first amplifier 204a of the driver 201a is coupled to the input terminal of the first amplifier 204b of the driver 201b through the first input pad 206b of the driver 201b. The output terminal of the first amplifier 204b of the driver 201b is coupled to the input terminal of the first amplifier 204c of the driver 201c through the first input pad 206c of the driver 201c. The output terminal of the first amplifier 204c of the driver 201c is coupled to the input terminal of the first amplifier 204a of the driver 201a through the first input pad 206a of the driver 201a. In the same way, the output terminal of the second amplifier 205a of the driver 201a is coupled to the input terminal of the second amplifier 205b of the driver 201b through the second input pad 207b of the driver 201b. The output terminal of the second amplifier 205b of the driver 201b is coupled to the input terminal of the second amplifier 205c of the driver 201c through the second input pad 207c of the driver 201c. The output terminal of the second amplifier 205c of the driver 201c is coupled to the input terminal of the second amplifier 205a of the driver 201a through the second input pad 207a of the driver 201a.

The output terminal of the first amplifier 204c of the last stage driver 201c is connected to the input terminal of the first amplifier 204a of the first driver 201a by using a transmission line 203. The output terminal of the second amplifier 205c of the last stage driver 201c is connected to the input terminal of the first amplifier 204a of the first stage driver 201a through a transmission line 202. At the same time, the input terminals of the first amplifiers 204a, 204b, and 204c of the drivers 201a, 201b, and 201c are laid across the transmission lines 202, 203 and the input terminals of the second amplifiers 205a, 205b, and 205c of the drivers 201a, 201b, and 201c are also laid across the transmission lines 202 and 203. In this embodiment, the transmission lines are thin film transmission lines, for instance, but not limited to thin film lines.

Since the first amplifiers and the second amplifiers are connected in series, the rescue signal will be amplified before transmission to the next stage driver. Consequently, the present invention can reduce the degradation of the rescue signal that is caused by the high resistance of the thin film transmission lines.

Figure 3:
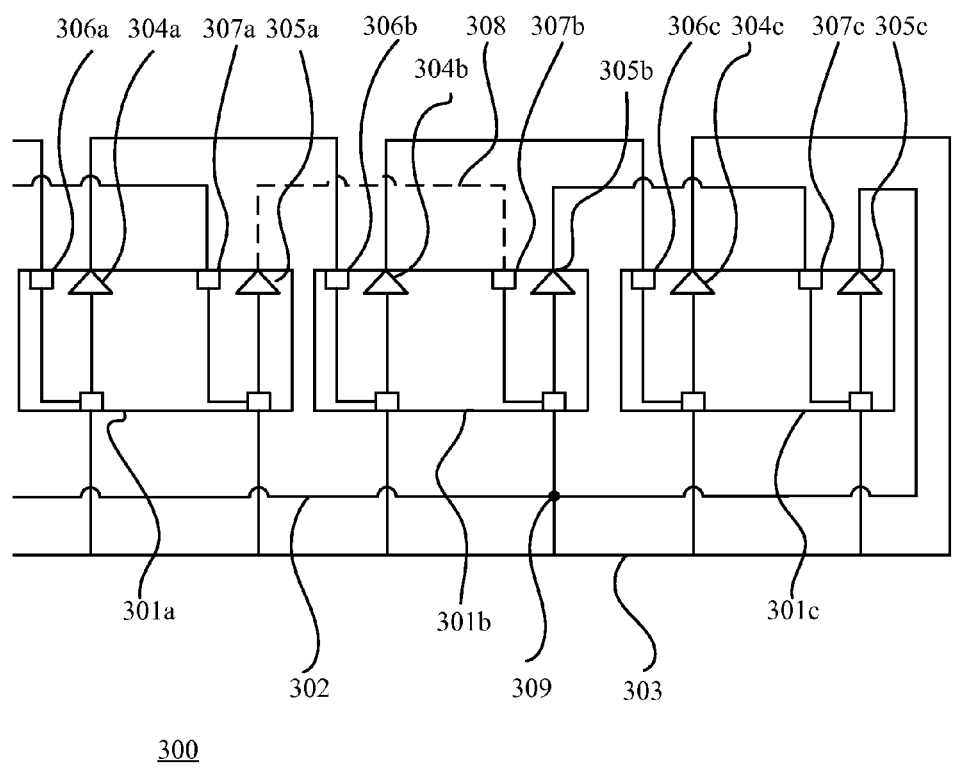
FIG. 3 shows the repairing mechanism of the present invention.

FIG. 3 illustrates the repair mechanism of the present invention. In the following description, the repair of the open transmission lines between the drivers 301a, 301b, and 301c is described. The structure and connective relationship illustrated in FIG. 3 are similar to those illustrated in FIG. 2B. Using driver 301b as an example, when the driver 301b cannot transmit the signal to the next stage driver due to the open transmission lines, the input terminal of the first amplifier 304b and/or the input terminal of the second amplifier 305b and the transmission line 302 can be welded by a laser. In the preferred embodiment, the input terminal of the first amplifier 304b of the driver 301b is electrically connected to the output terminal of the first amplifier 304c of the last stage driver 301c. In another embodiment, the input terminal of the second amplifier 305b of the driver 301b is electrically connected to the output terminal of the second amplifier 305c of the last driver 301c. In FIG. 3, the input terminal of the second amplifier 305b of the driver 301b is electrically connected to the output terminal of the second amplifier 305c of the last stage driver 301c by a laser and forms a welding point 309 on the connection point. Because the rescue lines are connected to a system (not shown), the system outputs the rescue signals to the first amplifier 304b and/or the second amplifier 305b by passing through the rescue lines (transmission lines 302, 303).

In preferred embodiments, the drivers of the present invention are connected serially. Thus, after the rescue signal is inputted to the amplifier, it is amplified by the amplifier and then transmitted to the corresponding amplifier of the next stage driver. Since the welding points generated by the laser occur only at the input terminal, the degradation of the rescue signal caused by the increased resistance of the welding points can be avoided. Meanwhile, after the rescue signals are inputted to the amplifier of a driver, the rescue signal will be transmitted to the next stage driver. The amplifier will then turn idle and the transmission line between the amplifier and the next stage driver can be cut off, such as the transmission line 308 in FIG. 3. Thus, the power consumption of the driver circuit 25 can be reduced. In another embodiment, if the scan driver circuit 24 comprises a plurality of scan drivers, those scan drivers can be connected in a similar way as described by the drivers 201a, 201b, 201c.

Figure 4:
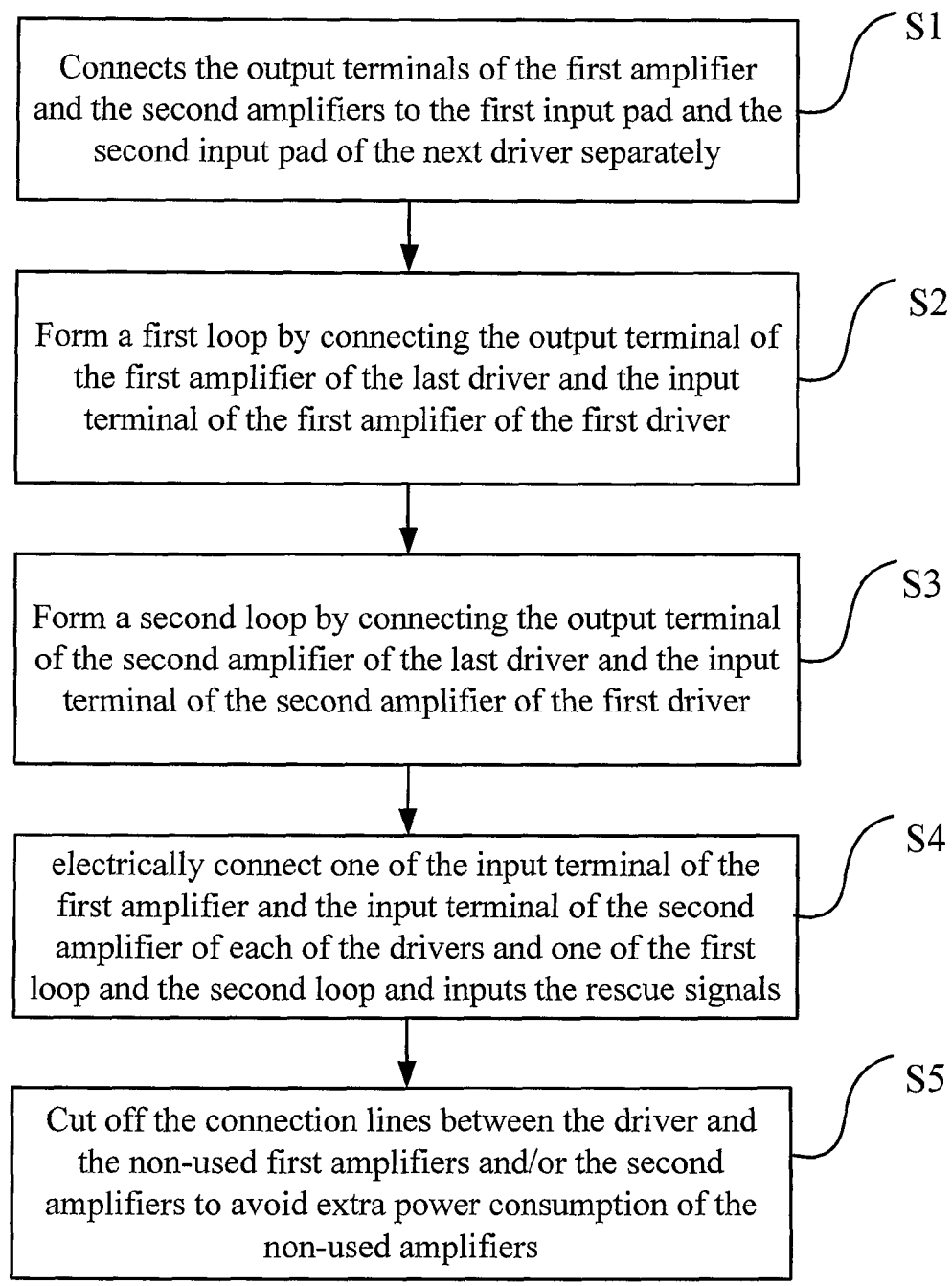
FIG. 4 shows the flowchart of the repair method of the present invention.

FIG. 4 illustrates the flowchart of the repair method of the present invention. In step S1, the output terminals of the first amplifier and the second amplifiers are connected to the first input pad and the second input pad of the next stage driver separately. Next, step S2 is executed to form a first loop by connecting the output terminal of the first amplifier of the last stage driver and the input terminal of the first amplifier of the first stage driver. Then, step S3 is executed to form a second loop by connecting the output terminal of the second amplifier of the last stage driver and the input terminal of the second amplifier of the first stage driver.

When repair is required, the method executes step S4 to electrically connect one of the input terminal of the first amplifier and the input terminal of the second amplifier of each of the drivers and one of the first loop and the second loop and inputs the rescue signals. Finally, step S5 is executed to cut off the connection lines between the driver and the non-used first amplifiers and/or the second amplifiers to avoid extra power consumption of the unused amplifiers.

The present invention serially connects amplifiers, so that the rescue signals will be amplified continuously after being inputted into the amplifiers. For the same reason, no welding occurs at the cross points of the output terminals of the amplifiers and the thin film transmission lines. Moreover, the rescue signals will be amplified, so the effect caused by the high resistance of the thin film transmission lines can be prevented. After transmitting the rescue signals, the amplifier will turn to idle, so the power consumption of the amplifier will be reduced.

While the invention has been described by way of example and in terms of the preferred embodiment, it is to be understood that the invention is not limited to the disclosed embodiments. Rather, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A liquid crystal display device, comprising:
a glass substrate;
a plurality of scan lines formed on the glass substrate;
a plurality of data lines formed on the glass substrate;
a plurality of pixels formed on cross sections of the scan lines and the data lines; and
a plurality of drivers formed on the glass substrate and connected serially according to an ordering sequence for driving the pixels, each of the drivers comprising:
a first amplifier including an input terminal and an output terminal, the output terminal of the first amplifier being coupled to the input terminal of the first amplifier of the next stage driver according to the ordering sequence;
a second amplifier including an input terminal and an output terminal, the output terminal of the second amplifier being coupled to the input terminal of the second amplifier of the next stage driver according to the ordering sequence;
a first input pad;
a second input pad;
a third input pad electrically connected to the first input pad and the input terminal of the first amplifier; and
a fourth input pad electrically connected to the second input pad and the input terminal of the second amplifier;
wherein the output terminal of the first amplifier of each of the drivers is electrically connected to the first input pad of the corresponding next stage driver, and the output terminal of the second amplifier of each of the drivers is electrically connected to the second input pad of the corresponding next stage driver
wherein the output terminal of the first amplifier of the last driver is electrically connected to the input terminal of the first amplifier of the first driver via a first transmission line, and the output terminal of the second amplifier of the last driver is electrically connected to the input terminal of the second amplifier of the first driver via a second transmission line,
wherein the input terminal of the first amplifier of each of the drivers is laid across the second transmission lines through the corresponding third input pad and is electrically connected to the first transmission lines through the corresponding third input pad, and the input terminal of the second amplifier of each of the drivers is laid across the second transmission lines through the corresponding fourth input pad and is electrically connected to the first transmission line through the corresponding third input pad.

2. The liquid crystal display device of claim 1, wherein each of the drivers is one of a scan driver and a data driver.

3. The liquid crystal display device of claim 1, wherein the transmission line is a thin film transmission line.

4. The liquid crystal display device of claim 1, wherein the input terminal of each of the first amplifiers and the second amplifiers are selectively welded with the transmission line by laser.

5. The drive circuit of claim 1, wherein the transmission line is a thin film transmission line.

6. The drive circuit of claim 1, wherein the input terminal of each of the first amplifiers and the second amplifiers are selectively welded with the transmission line by laser.

7. A driver circuit, comprising:
a plurality of signal lines; and a plurality of drivers connected serially according to an ordering sequence and coupled to the signal lines, each of the drivers comprising:
- a first amplifier including an input terminal and an output terminal, the output terminal of the first amplifier being coupled to the input terminal of the first amplifier of the next stage driver according to the ordering sequence;
- a second amplifier including an input terminal and an output terminal, the output terminal of the second amplifier being coupled to the input terminal of the second amplifier of the next stage driver according to the ordering sequence;
- a first input pad;
- a second input pad;
- a third input pad electrically connected to the first input pad and the input terminal of the first amplifier; and
- a fourth input pad electrically connected to the second input pad and the input terminal of the second amplifier;

wherein the output terminal of the first amplifier of each of the drivers is electrically connected to the first input pad of the next stage driver, and the output terminal of the second amplifier of each of the drivers is electrically connected to the second input pad of the next stage driver, wherein the output terminal of the first amplifier of the last driver is electrically connected to the input terminal of the first amplifier of the first driver via a first transmission line, and the output terminal of the second amplifier of the last driver is electrically connected to the input terminal of the second amplifier of the first driver via a second transmission line, wherein the input terminal of the first amplifier of each of the drivers is laid across the second transmission lines through the corresponding third input pad and is electrically connected to the first transmission lines through the corresponding third input pad, and the input terminal of the second amplifier of each of the drivers is laid across the second transmission lines through the corresponding fourth input pad and is electrically connected to the first transmission line through the corresponding third input pad.

8. The driver circuit of claim 7, wherein each of the drivers is one of a scan driver and a data driver.

9. A method for repairing a driver circuit, the driver circuit comprising a plurality of drivers, the drivers connected serially according to an ordering sequence, each of the drivers comprising a first amplifier, a second amplifier, a first input pad, a second input pad, a third input pad, and a fourth input pad, each of the first amplifiers including an input terminal and an output terminal, each of the second amplifier including an input terminal and an output terminal, the third input pad of each of the drivers being connected to the first input pad and the input terminal of the first amplifier within the same driver, the fourth input pad of each of the drivers being electrically connected to the second input pad and the input terminal of the second amplifier within the same driver, the output terminal of the first amplifier of each of the drivers being electrically connected to the first input pad of the corresponding next stage driver, the output terminal of the second amplifier of each of the drivers being electrically connected to the second input pad of the corresponding next stage driver according to the ordering sequence, the method comprising the steps of:
- forming a first loop by connecting the output terminal of the first amplifier of the last stage driver to the input terminal of the first amplifier of the first stage driver;
- forming a second loop by connecting the output terminal of the second amplifier of the last stage driver to the input terminal of the second amplifier of the first stage driver; and
- selectively welding one of the input terminal of the first amplifier and the input terminal of the second amplifier with one of the first loop and the second loop, wherein the input terminal of the first amplifier of each of the drivers is laid across the second transmission lines through the corresponding third input pad and is electrically connected to the first transmission lines through the corresponding third input pad, and the input terminal of the second amplifier of each of the drivers is laid across the second transmission lines through the corresponding fourth input pad and is electrically connected to the first transmission line through the corresponding third input pad.

10. The method of claim 9, further comprising the step of:
cutting off the connection line between an unused amplifier and a repaired driver by a laser.

* * * * *